Dec. 25, 1962  F. P. ROSAPEPE  3,070,293
TOLL COLLECTION BOXES
Filed Sept. 10, 1956  2 Sheets-Sheet 1
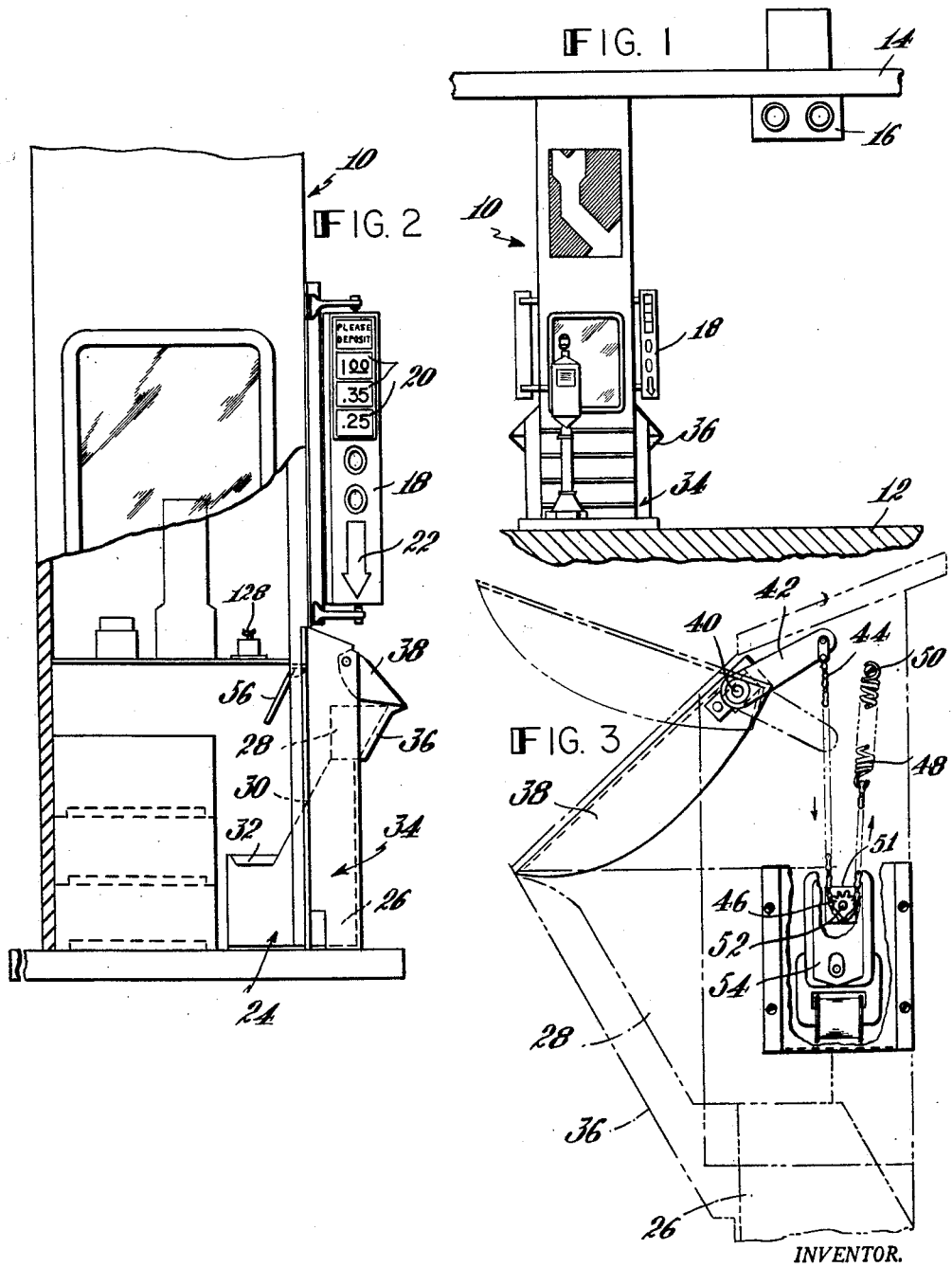
INVENTOR.
Frank P. Rosapepe
BY Roberts, Cushman & Grover
ATTORNEYS

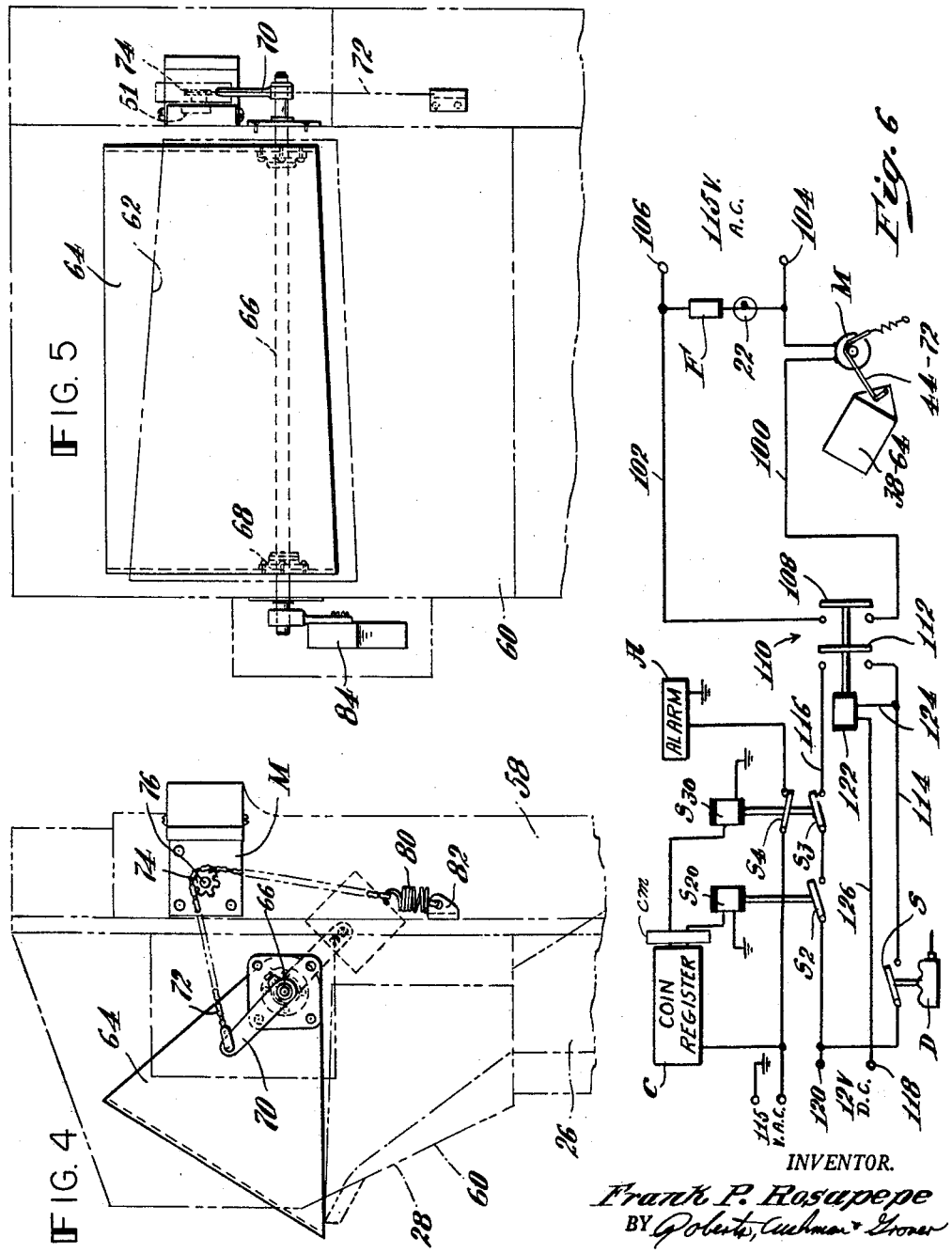

United States Patent Office 3,070,293
Patented Dec. 25, 1962

3,070,293
TOLL COLLECTION BOXES
Frank P. Rosapepe, Cranston, R.I., assignor, by mesne assignments, to Universal Controls, Inc., New York, N.Y., a corporation of Maryland
Filed Sept. 10, 1956, Ser. No. 608,867
13 Claims. (Cl. 235—33)

This invention relates to toll collection meter boxes for highways, bridges, tunnels and the like, although it is to be understood that it may be used for other collection purposes where a fare or toll is exacted for use or service.

Toll collection boxes of the kind referred to have a hopper for receiving the toll fare and conducting it into the box for registering and totaling. The hopper must of necessity be quite large so that the motorist can toss the toll into it with the least possible delay and because of this it will also admit rain or snow to the box which is undesirable. An object of this invention is to provide a meter box with a hopper which will not collect rain and/or snow. Another object is to provide a meter with a hopper which normally will be covered so as to exclude rain and/or snow but which can be made readily accessible for the deposit of a toll when desired. Another object is to provide a meter with a hopper which is normally covered until a motor vehicle approaches whereupon it is uncovered to permit deposit of the toll. Another object is to provide a meter with a hopper which after being made accessible is maintained accessible until the toll is deposited whereupon it is automatically made inaccessible. Another object is to provide a meter with a hopper in which the deposit of an incorrect amount of toll automatically makes the hopper inaccessible and operates a signal. Another object is to provide a meter wherein the motorist can see the toll he has deposited. Another object is to provide a meter with a hopper which is contained within a weatherproof housing which may be a toll booth or an independent shelter. Another object is to provide a meter with a hopper and hood therefor which may be operated to uncover or cover the hopper with or without an attendant. Another object is to provide a meter with a hopper which when employed with a conventional toll booth can be installed in the doorway of the booth. Another object is to provide a meter with a hopper which may be installed in a toll booth in such fashion that it may be moved into the booth to make the hopper inaccessible and moved out of the booth to make it accessible. Another object is to provide a movable meter and hopper which are automatically movable from within the booth to a position outside of the booth as a motor vehicle approaches it for receiving a deposit of the toll.

The invention will now be described in greater detail with reference to the accompanying drawings wherein:

FIG. 1 is an elevation of a toll booth as seen from the approach side, showing a meter, hopper and hood therefor at the right side for a motorist approaching the booth from the front and one at the left side for a motorist approaching the booth from the opposite direction;

FIG. 2 is a greatly enlarged elevation of the booth with the front wall broken away to show the installation of the meter, hopper and hood therefor;

FIG. 3 is a still larger elevation partly diagrammatic showing the hood for the hopper and the means for elevating and closing it;

FIG. 4 is a similar enlarged elevation of a housing or shelter with a hood enclosing a meter box and hopper for use when there is no toll booth available;

FIG. 5 is a plan view of FIG. 4; and

FIG. 6 is a wiring diagram for the motor which lifts the hood including the circuits responsive to the deposit of toll to interrupt the motor circuit.

Referring to the drawings (FIG. 1), there is shown a toll booth 10 of which there may be several located transversely of a highway 12. Across the top of the several booths there is generally a connecting canopy 14 which supports, between booths, signal lights 16 which are customarily green and red and face the direction from which the vehicles are approaching so as to indicate whether a vehicle should enter the lane beneath the lights or not. On one or both sides of the booth, depending upon whether it is at the edge of the highway or at some intermediate point, there are mounted on laterally extending brackets toll indicators 18 having one or more illuminated areas 20 with predetermined toll fares stenciled thereon, and an illuminated arrow 22 pointing downwardly to indicate where the toll is to be deposited.

The toll collection box or meter box 24, as shown in FIG. 2, is of the kind having a substantially rectangular base 26, within which there is a storage vault; a truncated portion 30 having an inspection area situated behind a window therein; a totaling register 32; and a hopper 28 for receiving the toll for delivery, first to the inspection area and then into the vault. The toll box, as shown, is installed in an opening in one side of the booth with a portion of it extending into the booth and with the hopper situated outside of the booth next to the traffic lane. A protective housing 34, consisting of spaced side walls, a front wall, and a top wall is fastened to the wall of the booth so as to enclose the toll box and has in its front wall a forwardly and upwardly inclined trough 36 so located as to accommodate the hopper 28 of the toll box. Above the trough 36 there is a hood 38 which is pivotally supported on a shaft 40 (FIG. 3), extending transversely between the side walls and journaled therein, upon which the hood may be swung from a position such as shown in FIGS. 1 and 2, having contact with the upper edge of the trough to an open position, wherein it is elevated as shown in FIG. 3 to permit a motorist to drop the correct amount of toll into the hopper 28. The hood is normally closed, being held down by its own weight, and is raised by a motor M (FIG. 6), as will be described. In the lane ahead of the toll booth, in the direction of approach, thereto there is means over which the vehicle must pass for starting the motor. This means may be mechanical, or as shown in FIG. 5 pneumatic, wherein it is in the form of a hose which when compressed by passage of the vehicle over it displaces a diaphragm D (FIG. 6) and closes a switch S (see FIG. 6).

An arm 42 (FIG. 3) is fastened to one end of the shaft 40 and this arm in turn, is connected to one end of a link chain 44, the opposite end of which is connected to one end of a spring 48. The opposite end of the spring is fixed to the booth by a bolt or other suitable fastening means 50. The link chain 44 passes about a sprocket 46 on the shaft 52 of the motor M and this motor is in a circuit within which the aforesaid switch S is located (FIG. 6). When the switch S is closed and the motor M is energized, it rotates the sprocket 46 in a counterclockwise direction. This draws the chain 44 downwardly and hence elevates the hood 38, that portion of the chain moving upwardly being taken up by contraction of the spring 48. A conventional slip clutch 51 connects the shaft 52 to the sprocket 46, which permits the motor to continue rotating without injury after the hood has reached its wide open position. When the motor circuit is interrupted the hood falls back to its closed position by its own weight.

As explained above, the toll box is installed in a regular toll booth and may thus be used in any existing toll road system. In some cases where there are no toll booths, the toll box may be installed in a housing or shelter 58 of its own, as shown in FIGS. 4 and 5, which would be fastened to a cement base. The shelter, shown in broken lines, has four walls and a top completely enclosing the toll box 26 and the hopper 28. The wall next to the traffic lane has a forwardly inclined open top trough 60 for accommodating the hopper 28 of the toll box, as described heretofore. Above the hopper the front wall is cut away to provide an opening 62 which tapers from left to right in height, the greater height being at the left. Within the housing behind the opening 62 there is mounted a hood 64 which normally occupies the position shown in FIG. 4, with its lower edge resting on the lower edge of the opening 62 and in this position covering the top of the hopper situated within the trough 60. The hood is mounted on a horizontal shaft 66 rotatably mounted in bearings 68 fastened to the side walls and has fastened to one of its ends an arm 70. A chain 72 is fastened at one end to the arm 70, passes over a sprocket 74 (FIG. 4) on a shaft 76, and is connected at its opposite end to one end of a spring 80, the other end of which is fastened by a bracket 82 to the housing. The sprocket, as explained in the previous form, is connected through a slip clutch 51 to the shaft 76 of a motor M. Rotation of the motor in a clockwise direction rotates the arm 70 in a corresponding direction and lifts the hood so as to permit depositing a toll in the hopper. By reason of the slip clutch 51, when the hood reaches its wide open position the motor continues to rotate without damage to itself or the parts of the apparatus. By de-energizing the motor the hood is permitted to gravitate to a closed position. To assist in movement of the hood there is fastened to the opposite end of the shaft 66 a weight 84 which nearly counterbalances its weight so that very little power is required to open it. There is however a sufficient weight differential to cause the hood to close gravitationally when the motor is stopped.

As previously stated the motor is excited by depression of a pneumatic tube in the traffic lane head of the booth to open the hood, in either form of the invention. The hood is held in an open position until the correct amount of toll is dropped into the toll box, whereupon the motor is stopped and the hood allowed to return by gravity to its closed position. In the event that an incorrect toll fare is dropped in the box, the motor is stopped as before, so that the hood returns by gravity to its closed position and at the same time a signal either visual or auditory is given indicating that the incorrect toll has been deposited.

The motor circuit is shown diagrammatically in FIG. 6. In this circuit the motor M is connected by lines 100, 102 and terminals 104, 106 to a 115 volt, A.C. source. The motor is shown diagrammatically connected to the hood 38 or 64 as the case may be. In the line 102 is one element 108 of a double pole switch 110. The other element 112 is located in a holding circuit consisting of lines 114 and 116 connected through terminals 118, 120 to a 12 volt D.C. source. The double pole switch constitutes a holding relay 122 and is connected to the positive and negative terminals 120 and 118 by lines 124 and 126. In the line 114 there is the switch S which as previously related is closed by operation of the diaphragm D. When the switch S is closed the holding relay is energized to close the motor circuit and the holding circuit so that these circuits remain closed independently of the switch S which opens immediately after the pneumatic tube has been passed over. In the holding circuit there are two normally closed switches S2 and S3. The switch S2 is opened by deposit and registration of the correct amount of toll and the switch S3 is opened by deposit and registration of the incorrect amount of toll. A coin registering device C, including a memory device Cm, operates when the correct fare is deposited, through a solenoid S20, to open the switch S2 and, when the incorrect amount of fare is deposited, through another solenoid S30 to open the switch S3 and simultaneously to close a switch S4 for operating an alarm A. A memory device such as shown in the Johnson patent, No. 1,972,449, granted September 4, 1934, may be employed to determine the character of the deposit and when the correct deposit has been made to produce a signal indicating that the proper amount has been paid. When either one of the switches S2 or S3 is operated the holding circuit is interrupted whereupon the switch elements 108 and 112 are moved away from their contacts and the motor stops. Opening of the switch S3, as related above, is accompanied by closing of the switch S4 which operates the alarm, which may be a light signal or an audible signal for the purpose of notifying the motorist of the fact that he has not deposited the correct toll. The motor circuit includes a light flasher F which is actuated by closing of the motor circuit to cause the arrow 22 above the hopper to flash on and off as long as the hopper is open to draw the motorist's attention to the hopper as the place of deposit.

In order that the motorist may see the amount of toll he has deposited, a mirror 56 is mounted behind the box opposite the inspection area 30 (FIG. 2) which may be seen when the hood is open. When the meter box is used in a toll booth the attendant can see the amount of toll deposited by glancing down at the totaling register 32. If desired, the attendant may control opening and closing of the hood and provision for this is made by a manually depressible button or lever 128 located in the booth as shown in FIG. 2, which through appropriate mechanical or electrical means closes the switch S.

While the hopper is covered and uncovered as shown herein by a hood, it is within the scope of the invention to arrange the toll box and hopper so that it may be moved bodily from within the toll booth outwardly to expose it for deposition of the toll, for example, by mounting it on a carriage which is movable through a port or opening in the booth outwardly for deposit of the toll and inwardly to prevent unauthorized tampering and exposure to weather.

It should be understood that the present disclosure is for the purpose of illustration only and that this invention includes all modifications and equivalents which fall within the scope of the appended claims.

I claim:

1. At a pay station for collecting a fare or toll, a meter, a hopper attached to the meter for receiving the exacted toll and conducting it to the meter for recording, said hopper having an upwardly facing mouth of substantial area for receiving the toll, a housing enclosing the meter and hopper except for the mouth, a hood normally covering the mouth, motor driven means supported by the housing, operable to move the hood in a direction to uncover the mouth for reception of the toll, a switch operable to start the motor, and means located in the path of approach to the meter to operate the switch.

2. At a pay station for collecting a fare or toll, a meter including a memory device movable to a predetermined position by deposit of the correct toll, a hopper for receiving the exacted toll and delivering it to the meter for recording of the toll deposited, said hopper having an upwardly facing mouth of substantial area for receiving the toll, the mouth of the hopper normally being inaccessible, a motor and motor driven means including a slip clutch between the motor and said means operable to render the mouth accessible and means operable by movement of the memory to said predetermined position to stop the motor.

3. At a pay station for collecting a fare or toll, a meter including a memory device movable to a predetermined position by deposit of the correct toll, a hopper for receiving the exacted toll and delivering it to the meter for recording, said hopper having an upwardly facing mouth of substantial area for receiving the toll, the mouth of the hopper normally being inaccessible, motor driven means for rendering the mouth of the hopper accessible, a switch for starting the motor, means for holding the switch in operative position, and means operable by movement of the memory device to said predetermined position to stop the motor.

4. At a pay station for collecting a fare or toll, a meter including a memory device movable to a predetermined position by deposit of the correct toll, a hopper for receiving the exacted toll and delivering it to the meter for recording, said hopper having an upwardly facing mouth of substantial area for receiving the fare, the mouth of the hopper normally being inaccessible, motor driven means for rendering the mouth of the hopper accessible, a motor circuit including a switch operable to start the motor, means operable by movement of the memory device to said predetermined position to open the circuit and hence stopping the motor and means operable when the motor stops to render the mouth inaccessible.

5. At a pay station for collecting a fare or toll, a meter including a memory device movable to a predetermined position by deposit of the correct toll, a hopper for receiving the exacted toll and delivering it to the meter for recording, said hopper having an upwardly facing mouth of substantial area for receiving the fare, the mouth of the hopper normally being inaccessible, motor driven means for rendering the mouth of the hopper accessible, a motor circuit including a switch for starting the motor, means for interrupting the circuit and hence stopping the motor when the memory device reaches said predetermined position and other means for interrupting the circuit and for stopping the motor when the memory device fails to reach said predetermined position.

6. At a pay station for collecting a fare or toll, a meter including a memory device movable to a predetermined position by deposit of the correct toll, a hopper for receiving the exacted toll and delivering it to the meter for recording, said hopper having an upwardly facing mouth of substantial area for receiving the fare, the mouth of the hopper normally being inaccessible, motor driven means for rendering the mouth of the hopper accessible, a motor circuit including a switch for starting the motor, means operable by movement of the memory device to said predetermined position to interrupt the circuit and hence to stop the motor and render the mouth inaccessible, and other means operable in the event that the memory device fails to reach said position to interrupt the circuit, stop the motor, render the mouth inaccessible and give a signal.

7. At a pay station for collecting a fare or toll, a meter box including a memory device movable to a predetermined position by deposit of the correct toll, a hopper for receiving the exacted toll and delivering it to the meter box for recording and storage, said hopper having an upwardly facing mouth of substantial area for catching fare tossed thereinto, a closure normally covering the mouth of the hopper, a motor operable to retract the closure from the mouth, vehicle operable means for initiating operation of the motor, and means operable by movement of the memory device to said predetermined position to restore the closure to its normal position.

8. At a pay station for collecting a fare or toll, a housing, a meter box situated within the housing, a hopper mounted on the housing in a position to deliver coins deposited into it to the meter box, said hopper having a wide mouth, a cover mounted on the housing over the mouth of the hopper, said cover being retractable to uncover the mouth, means operable by a prearranged signal to retract the cover and other means operable by meter registration of the right amount of fare to close the cover.

9. At a pay station for collecting a fare, a housing, a meter box situated within the housing, a hopper arranged within the housing in a position to deliver coins to the meter box, said hopper having a wide mouth, a pivotally mounted hood normally covering the mouth of the hopper, a lever operable to tilt the hood to an open position, motor driven means operably connected to the lever to open the hood at a predetermined signal and to close the hood in response to registration of the correct amount of fare in the meter box.

10. At a pay station for collecting a fare, a housing, a meter box situated within the housing, a hopper arranged within the housing in a position to deliver coins to the meter box, said hopper having a wide mouth, a pivotally mounted hood, normally covering the mouth of the hopper, a lever, a trace connected to one end of the lever and at its other end to the housing, a motor, a motor driven element tractively engaged with the trace between its ends to traverse the trace in one direction, to open the hood, means for energizing the motor prior to disposition of the toll, and means for de-energizing the motor when the correct amount of toll is registered by the meter box, said hood being returned to its closed position gravitationally when the motor is de-energized.

11. At a pay station for collecting a fare, a housing, a meter box, a hopper mounted on the meter box to receive and convey coins to the meter box, said hopper having a wide mouth to catch coins tossed thereinto, said meter box and hopper being situated within the housing and the latter having an opening through which there is access to the mouth of the hopper, a hood mounted on the housing so as normally to cover the opening, means operable to move the hood to a position to uncover the opening, thereby to expose the mouth, and means for rendering said last-named means inoperative so as to prevent access to the mouth.

12. At a toll point, a booth situated adjacent a traffic lane, a housing projecting laterally from the side of the booth parallel to the lane, said housing being in communication with the interior of the booth, and having a projecting trough open at its top, a cover pivoted on the housing above the trough and normally closing the same, a coin registering box situated within the booth, a hopper situated within the housing, said hopper having an upper mouth registering with the open top of the trough and a lower end in communication with the coin box, means operable to lift the cover to expose the hopper mouth within the trough and pressure operated means located in the traffic lane ahead of the booth for initiating operation of said operable means.

13. At a toll point along a highway, a booth situated adjacent the traffic lane, a housing projecting from the side of the booth parallel to the lane, said housing being in communication with the interior of the booth, an open top trough projecting from the front wall of the housing at about the level of the normal vehicle window, a cover pivoted on the housing above the trough to swing from a position normally closing the trough to an elevated position exposing the open top of the trough, a coin box situated in the booth and partially in the housing, a hopper situated in the housing with an open top in registration with the open top of the trough and its lower end in communication with the coin box, means operable to raise the cover to expose the open hopper, pressure operated means in the lane approaching the booth for effecting operation of said last-named means, means by which the motorist may see the coins deposited in the meter box and means for closing the cover when the correct amount of coins have been deposited.

References Cited in the file of this patent

UNITED STATES PATENTS

| | | |
|---|---|---|
| 794,870 | Lofland | Jan. 11, 1905 |
| 1,401,732 | Reynolds | Dec. 27, 1921 |
| 2,073,834 | Duany | Feb. 17, 1936 |
| 2,334,143 | Basquin | Feb. 17, 1941 |
| 2,533,654 | Wilcox et al. | Dec. 12, 1950 |
| 2,815,108 | Fitzpatrick et al. | Dec. 3, 1957 |